(12) United States Patent
Brush et al.

(10) Patent No.: US 10,511,008 B2
(45) Date of Patent: Dec. 17, 2019

(54) BATTERY CONTACT WITH A SURFACE TEXTURE

(71) Applicant: TTI (MACAO COMMERCIAL OFFSHORE) LIMITED, Macau (MO)

(72) Inventors: James Brush, Greenville, SC (US); Mao Zhen Guo, Dong Guan (CN); Brent M. Willey, Anderson, SC (US); William S. Miller, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 238 days.

(21) Appl. No.: 15/462,275

(22) Filed: Mar. 17, 2017

(65) Prior Publication Data

US 2017/0271645 A1  Sep. 21, 2017

Related U.S. Application Data

(60) Provisional application No. 62/309,520, filed on Mar. 17, 2016.

(51) Int. Cl.
*H01M 2/30* (2006.01)
*H01M 2/32* (2006.01)
*H01M 2/10* (2006.01)

(52) U.S. Cl.
CPC ........... *H01M 2/30* (2013.01); *H01M 2/1055* (2013.01); *H01M 2/32* (2013.01); *H01M 2220/30* (2013.01)

(58) Field of Classification Search
CPC .. H01M 2220/30; H01M 2/1055; H01M 2/30; H01M 2/32
See application file for complete search history.

(56) References Cited

U.S. PATENT DOCUMENTS

| | | |
|---|---|---|
| 2,615,946 A | 10/1952 | Katzman |
| 3,337,834 A | 8/1967 | Godwin |
| 3,858,956 A | 1/1975 | Garrett |
| 5,087,214 A | 2/1992 | Dewar |
| 5,183,419 A | 2/1993 | Dewar |
| 5,558,545 A | 9/1996 | Staab |
| 6,007,939 A * | 12/1999 | Clowers .................... B25F 5/00 |
| | | 429/100 |

(Continued)

FOREIGN PATENT DOCUMENTS

WO   WO2012051421 A2   4/2012

*Primary Examiner* — Adam A Arciero
(74) *Attorney, Agent, or Firm* — Michael Best & Friedrich LLP (57) ABSTRACT

Battery contact with surface texturing. Exemplary battery contacts are located within a battery pack. The battery pack is operable to provide power to a device through a device contact of the device. The battery pack includes a battery pack housing, at least one battery cell located within the battery pack housing, and battery contacts including a positive terminal and a negative terminal. The battery contacts are configured to engage the device contact of the device and allow electric current to transfer from the battery pack to the device. The battery contacts define a surface having a surface texture. The surface texture includes raised portions for contacting the device contact to allow electric current to transfer from the battery pack to the device. The surface texture also includes recessed regions spaced away from the surface and for providing a space between the battery contacts and the device contact.

16 Claims, 10 Drawing Sheets

(56) References Cited

U.S. PATENT DOCUMENTS

| | | | |
|---|---|---|---|
| 6,168,881 B1 * | 1/2001 | Fischer | B25F 5/02 |
| | | | 292/219 |
| 7,365,280 B2 | 4/2008 | Nishikawa | |
| 7,619,387 B2 * | 11/2009 | Amend | B25F 5/02 |
| | | | 173/170 |
| 7,722,416 B2 | 4/2010 | Gump | |
| 8,485,853 B2 | 5/2013 | Seifert | |
| 8,622,774 B2 | 1/2014 | Seifert | |
| 2009/0170381 A1 | 7/2009 | Sommovigo | |
| 2009/0297928 A1 * | 12/2009 | Taga | H01M 2/1055 |
| | | | 429/91 |
| 2012/0156549 A1 * | 6/2012 | Meintschel | H01G 9/016 |
| | | | 429/162 |
| 2015/0147623 A1 | 5/2015 | Ramsayer | |

* cited by examiner

BATTERY CONTACT WITH A SURFACE TEXTURE

RELATED APPLICATIONS

This application claims priority to U.S. Provisional Patent Application No. 62/309,520, filed on Mar. 17, 2016, the entire contents of which are hereby incorporated by reference.

FIELD OF THE INVENTION

The present invention relates to battery packs.

BACKGROUND OF THE INVENTION

Devices powered by battery packs (such as power tools) often experience vibration during operation. Such vibration may cause rapid movement of battery contacts of the battery pack relative to corresponding contacts of the device. The rapid movement of the battery contacts relative to the corresponding device contacts may lead to fretting corrosion, which can produce oxides that accumulate on a contact surface between the battery contacts and the corresponding device contacts. These accumulating oxides can increase the electrical resistance between the battery contacts and the corresponding device contacts, which generates heat.

SUMMARY OF THE INVENTION

In one embodiment, a battery pack is provided. The battery pack is operable to provide power to a device through a device contact of the device. The battery pack includes a battery pack housing, at least one battery cell located within the battery pack housing, and battery contacts including a positive terminal and a negative terminal. The battery contacts are configured to engage the device contact of the device and allow electric current to transfer from the battery pack to the device. The battery contacts define a surface having a surface texture. The surface texture includes raised portions for contacting the device contact to allow electric current to transfer from the battery pack to the device. The surface texture also includes recessed regions spaced away from the surface and for providing a space between the battery contacts and the device contact.

In another embodiment, an electrical combination including a battery pack and a device operable to be powered by the battery pack is provided. The battery pack includes a battery pack housing, at least one battery cell located within the battery pack housing, and battery contacts including a positive terminal and a negative terminal. The device includes a device housing configured to receive the battery pack. The battery pack is supported by and removably mounted to the device housing. The device further includes a device contact for engaging the battery contacts and facilitating electric current to transfer from the battery pack to the device. At least one of the device contact and the battery contacts include a surface texture including raised portions that define a contact surface between the device contact and the battery contacts to allow the electric current to transfer from the battery pack to the device. The surface texture further includes recessed regions recessed from the contact surface and defining a space between the device contact and the battery contacts.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE DRAWINGS

When a battery-powered device experiences vibration during operation, such vibration causes rapid movement of the battery contacts of the battery pack relative to the corresponding contacts of the device. The rapid movement of the battery contacts relative to the corresponding device contacts may lead to fretting corrosion, which produces oxides that accumulate on the contact surface between the battery contacts and the corresponding device contacts. The accumulating oxides increase the electrical resistance between the battery contacts and the corresponding device contacts, which generates heat. The invention provides, in one aspect, a battery pack including battery contacts with a surface texture on a portion of the battery contacts. In some embodiments, the surface texture reduces heat generated as a result of electric current passing through fretting corrosion at a contact surface between the battery contacts of the battery pack and the corresponding device contacts.

Figure 1A:
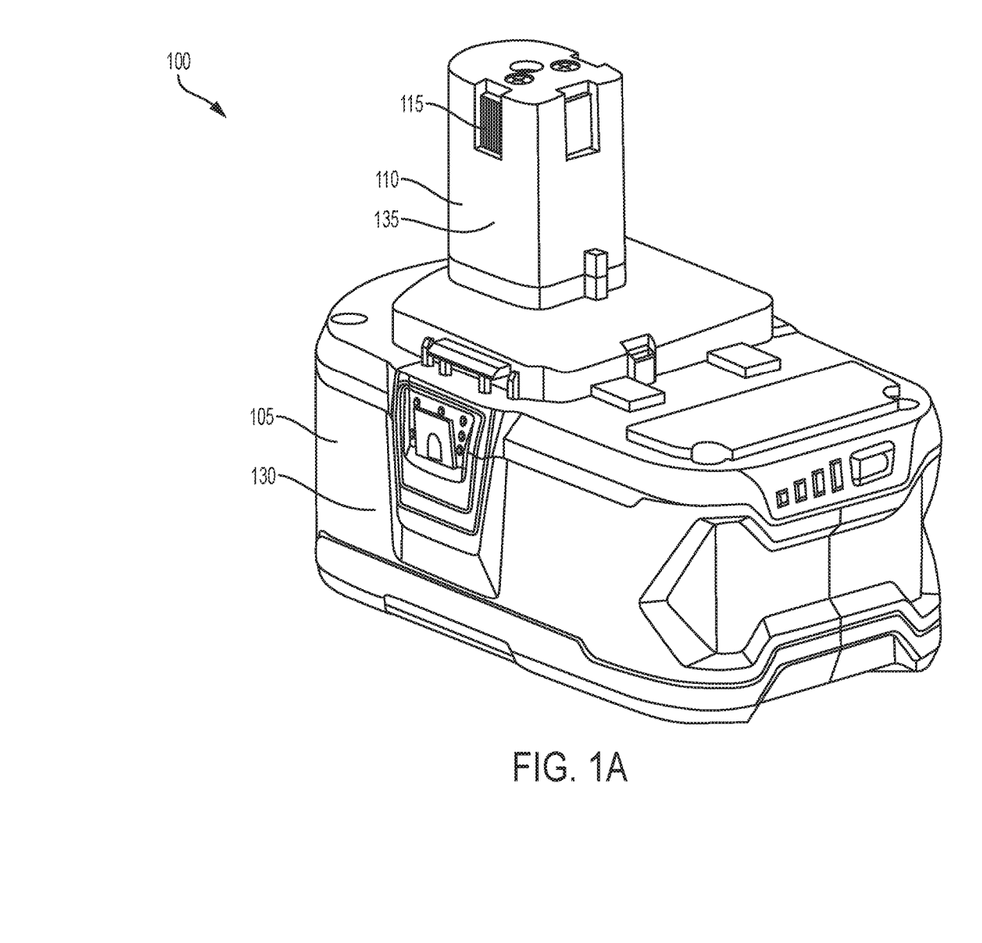
FIGS. 1A-1C are perspective views of a battery pack according to one embodiment of the invention.

FIG. 1A illustrates a battery pack 100 for coupling to a device 205, 250 (FIGS. 2A-2C), such as a power tool, to provide power to the device 205. In some embodiments, the battery pack 100 has a battery chemistry of Lithium-ion and a nominal voltage of approximately 18 Volts. The battery pack 100 includes a main body 105 that houses battery cells 120 (FIGS. 1B and 1C), a printed circuit board 125 (FIG. 1B and 1C), and other electrical components. The battery pack 100 also includes a tower portion 110 that extends upward and approximately perpendicular from the main body 105. The tower portion 110 includes battery contacts 115 (i.e., a positive terminal and a negative terminal) that provide power from the battery cells 120 to the device 205 that is coupled to the battery pack 100. The battery pack 100 also includes a battery pack housing including a main body housing 130 and a tower portion housing 135. As shown in FIG. 1A, the tower portion housing 135 extends from the main body housing 130. In some embodiments, the battery pack 100 has fewer or more battery cells 120.

Figure 1B:
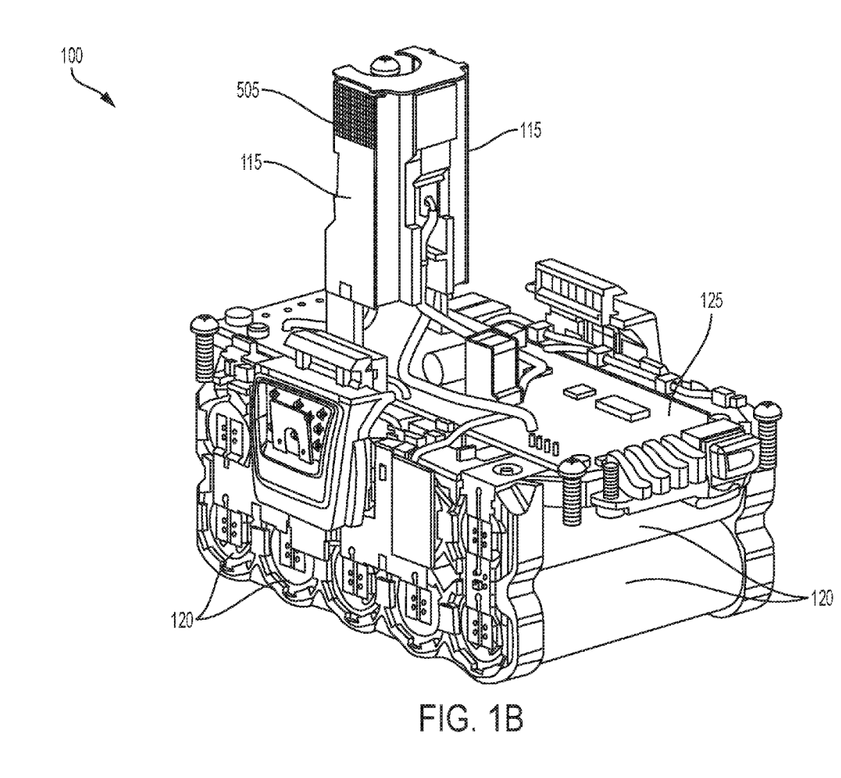
Figure 1C:
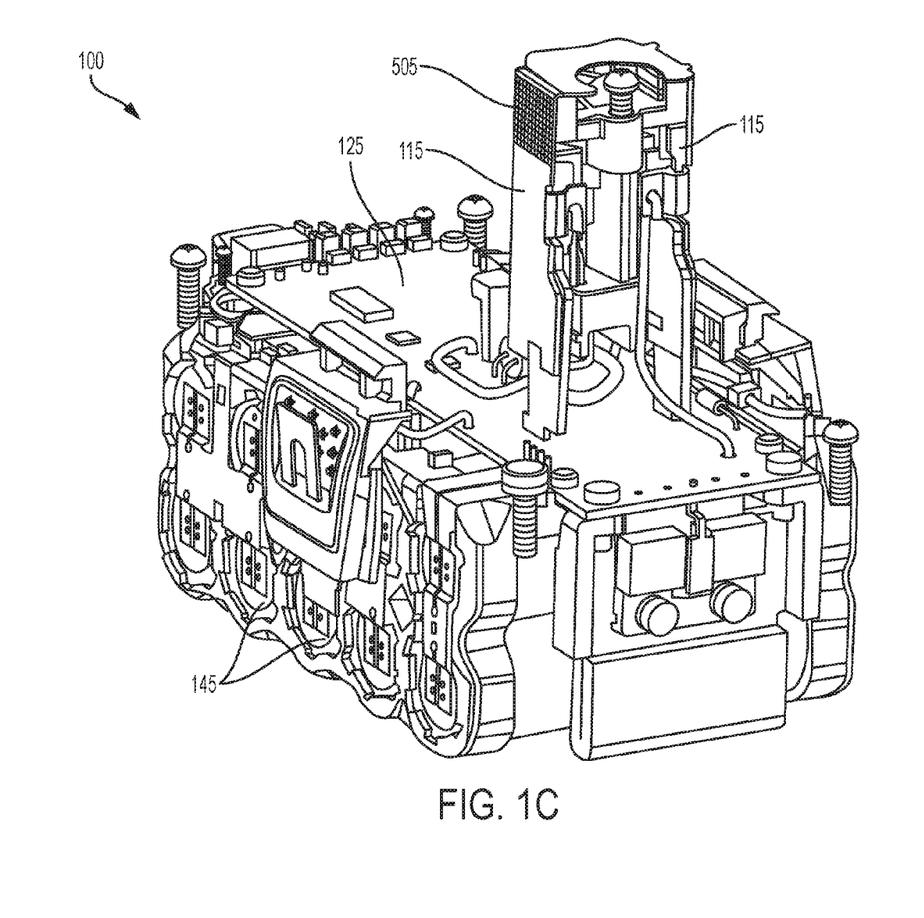

FIGS. 1B and 1C illustrate the battery pack 100 with main body housing 130 and tower portion housing 135 removed, with FIG. 1B showing a front-left perspective view of the battery pack 100 and FIG. 1C showing a rear-right perspective view of the battery pack 100. The battery contacts 115 define an outwardly facing first surface 410 (FIG. 4A) having a surface texture 405 (FIGS. 4A and 5), as will be explained in greater detail below. As shown in FIGS. 1B and 1C, the printed circuit board 125 is located in the main body housing 130 and has an upper surface that is substantially perpendicular to the outwardly facing first surfaces 410 of the battery contacts 115. In some embodiments, the printed circuit board 125 is located above the battery cells 120 and between the battery contacts 115 and the battery cells 120.

Figure 2A:
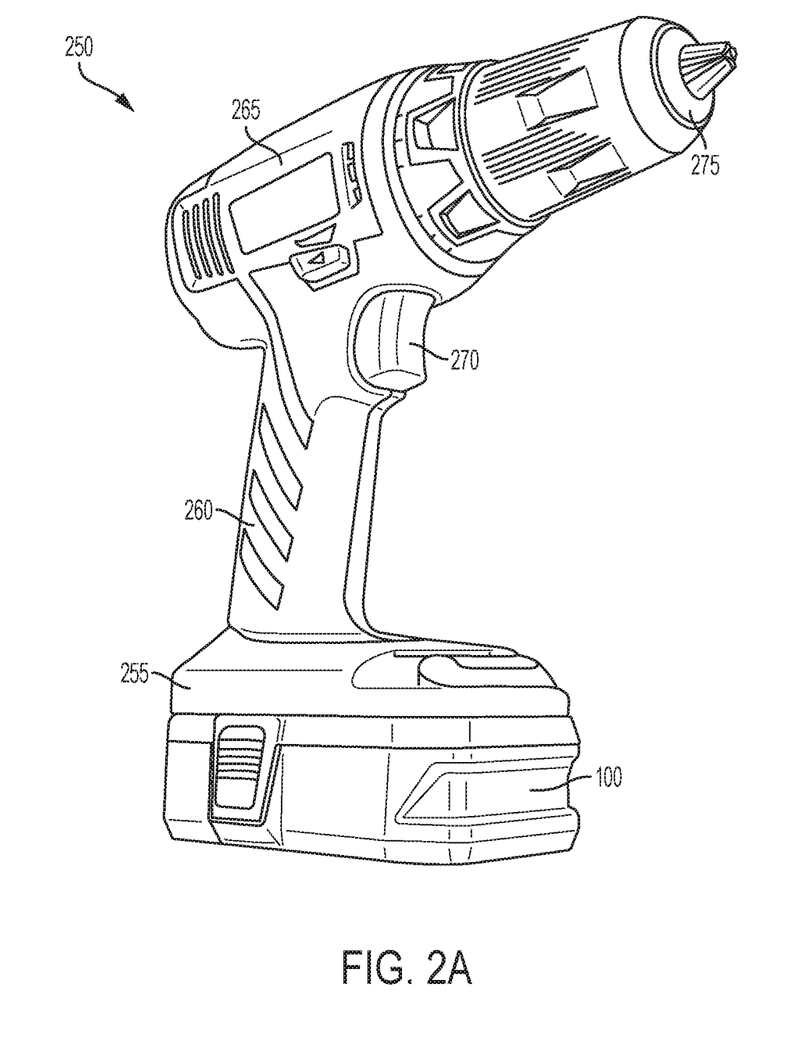
FIG. 2A is a perspective view of a device that can be powered by the battery pack of FIGS. 1A-1C.

FIG. 2A illustrates an exemplary device 250 that may be powered by the battery pack 100 (i.e., a power tool 250). In some embodiments, the power tool 250 causes or experiences vibration during operation when the battery pack 100 provides power to the power tool 250. As shown in FIG. 2A, the power tool 250 includes a battery receptacle portion 255 that receives the battery pack 100. Accordingly, in some embodiments, the battery pack 100 is supported by and removably mounted to a power tool housing (i.e., a device housing) of the power tool 250. The power tool 250 also includes a handle housing 260 connected between the battery receptacle portion 255 and a motor housing 265. A trigger 270 is located at an upper portion of the handle housing 260. An output part 275 is located at a front end of the motor housing 265. A motor (not shown) is located within the motor housing 265. The motor is coupled to a shaft to provide rotational movement to the output part 275 to complete a task (e.g., drilling, sanding, sawing, and the like) when the trigger 270 is depressed. Although FIG. 2A illustrates the power tool 250 as a drill, it should be understood that the power tool 250 may be another type of device that receives power from the battery pack 100. For example, in some embodiments, the power tool 250 may be a hammer drill, impact wrench, circular saw, reciprocating saw, angle grinder, buffer, sander, etc.

Figure 2B:
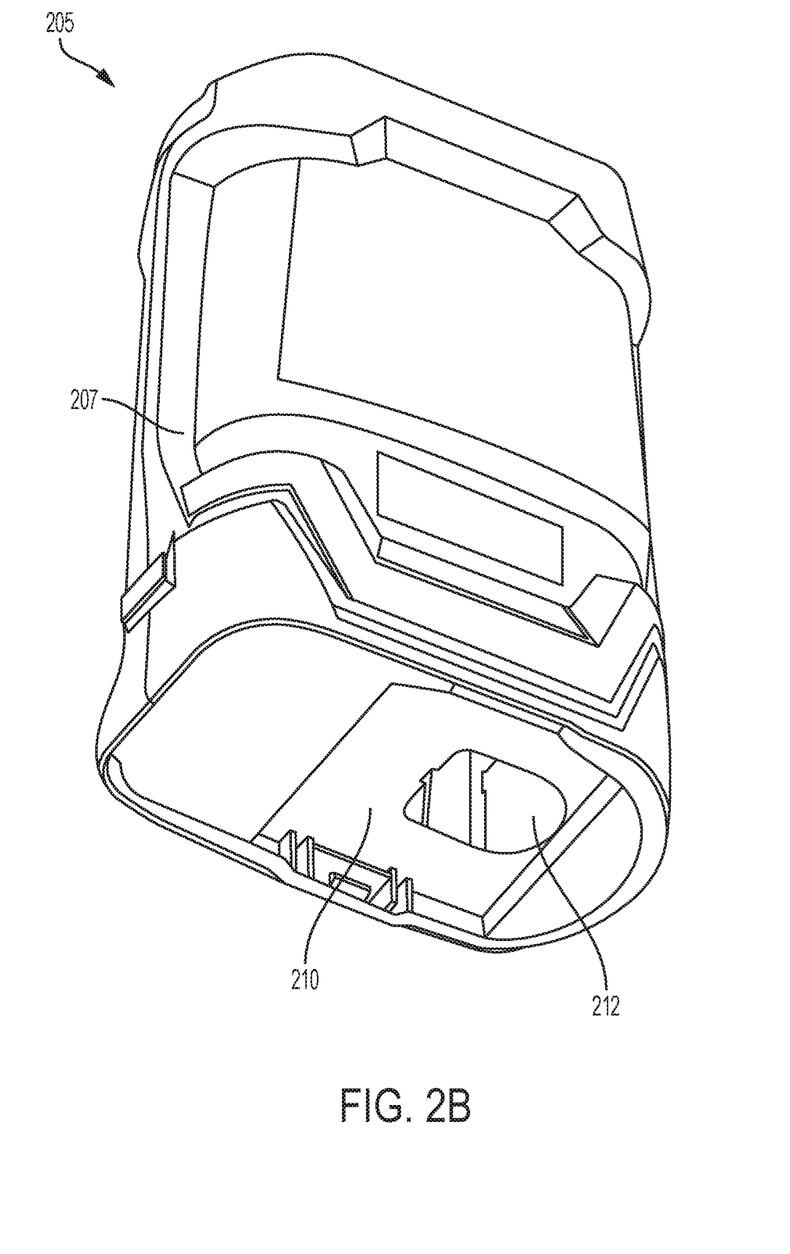
FIGS. 2B-2C are perspective views of another device that can be powered by the battery pack of FIGS. 1A-1C.
Figure 2C:
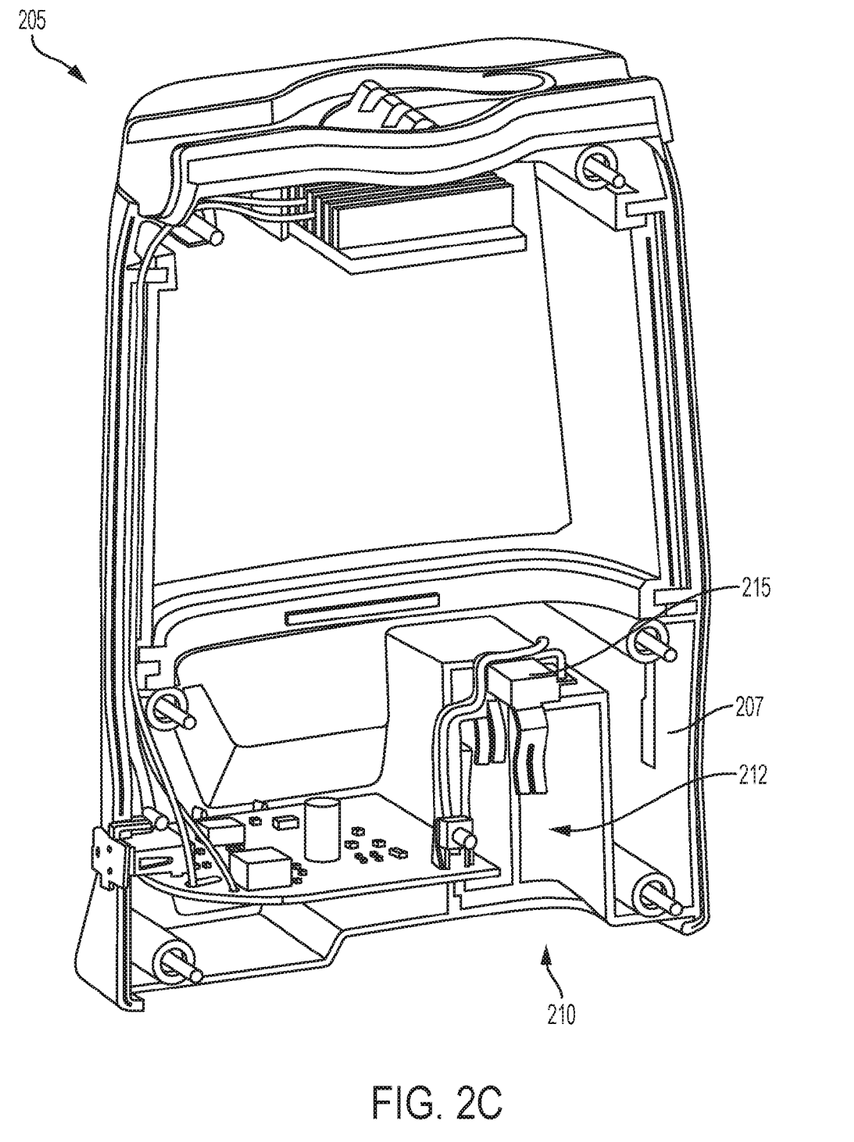

FIG. 2B illustrates another exemplary device 205 (i.e., a workshop light) that may be powered by the battery pack 100. The device 205 includes a device housing 207 having a battery receptacle portion 210 that receives the battery pack 100. FIG. 2C illustrates the device 205 with part of the housing 207 removed to allow an interior of the device 205 to be viewable. As shown in FIG. 2C, the battery receptacle portion 210 includes an opening 212 to receive the tower portion 110 of the battery pack 100. In some embodiments, the battery receptacle portion 210 may be similar to the battery receptacle portion 255 of FIG. 2A. The device 205 includes a device contact 215 (e.g., a leaf spring contact 215) that makes contact with the battery contacts 115 of the battery pack 100 when the battery pack 100 is inserted into the battery receptacle portion 210.

Figure 3:
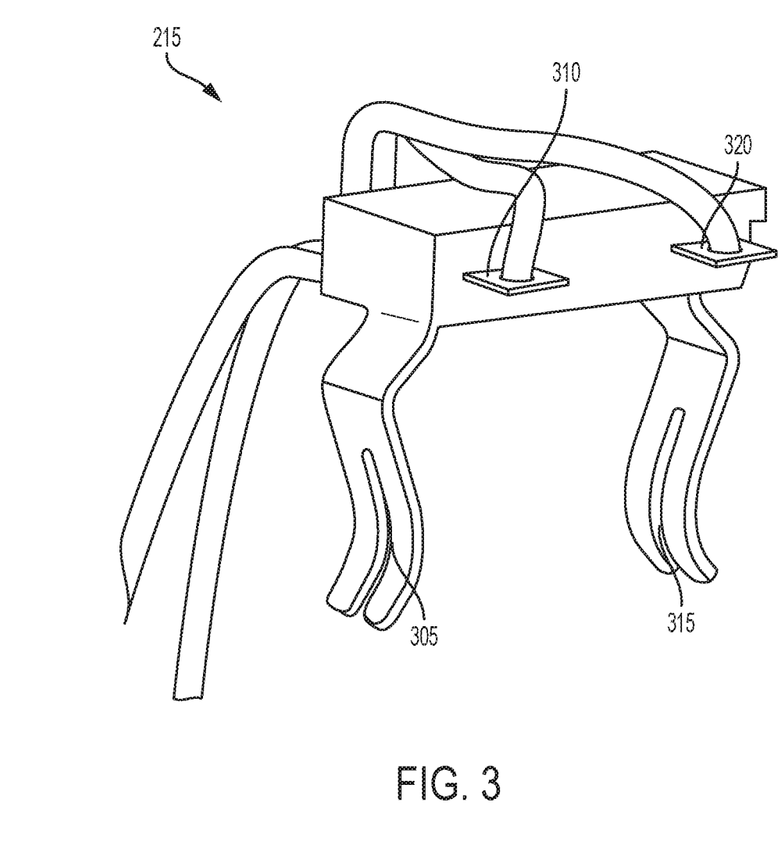
FIG. 3 is a perspective view of a leaf spring contact of the devices of FIGS. 2A-2C that is used to electrically couple the devices of FIGS. 2A-2C to the battery pack of FIGS. 1A-1C.

In particular, as shown in FIG. 3, the leaf spring contact 215 includes a first leg 305 (i.e., a first leaf spring 305) that is electrically coupled to a positive terminal 310 and a second leg 315 (i.e., a second leaf spring 315) that is electrically coupled to a negative terminal 320. When the battery pack 100 is inserted into the battery receptacle portion 210, the first leg 305 and the second leg 315 make contact with the positive and negative battery contacts 115, respectively, of the battery pack 100. In other words, the leaf spring contact 215 includes a pair of leaf springs 305, 315 that are each independently biased to maintain the general shape shown in FIG. 3. Accordingly, when the battery pack 100 is inserted into the battery receptacle 255 or 210, the leaf springs 305, 315 expand outwardly to receive the tower portion 110 of the battery pack 100. Because the leaf springs 305, 315 are biased to maintain the general shape shown in FIG. 3, when the battery pack 100 is fully inserted into the device 250 or 205, the leaf springs 305, 315 are biased inwardly (i.e., toward the tower portion 110) to make contact with the first surfaces 410 of the battery contacts 115.

Figures 4A, 4B:
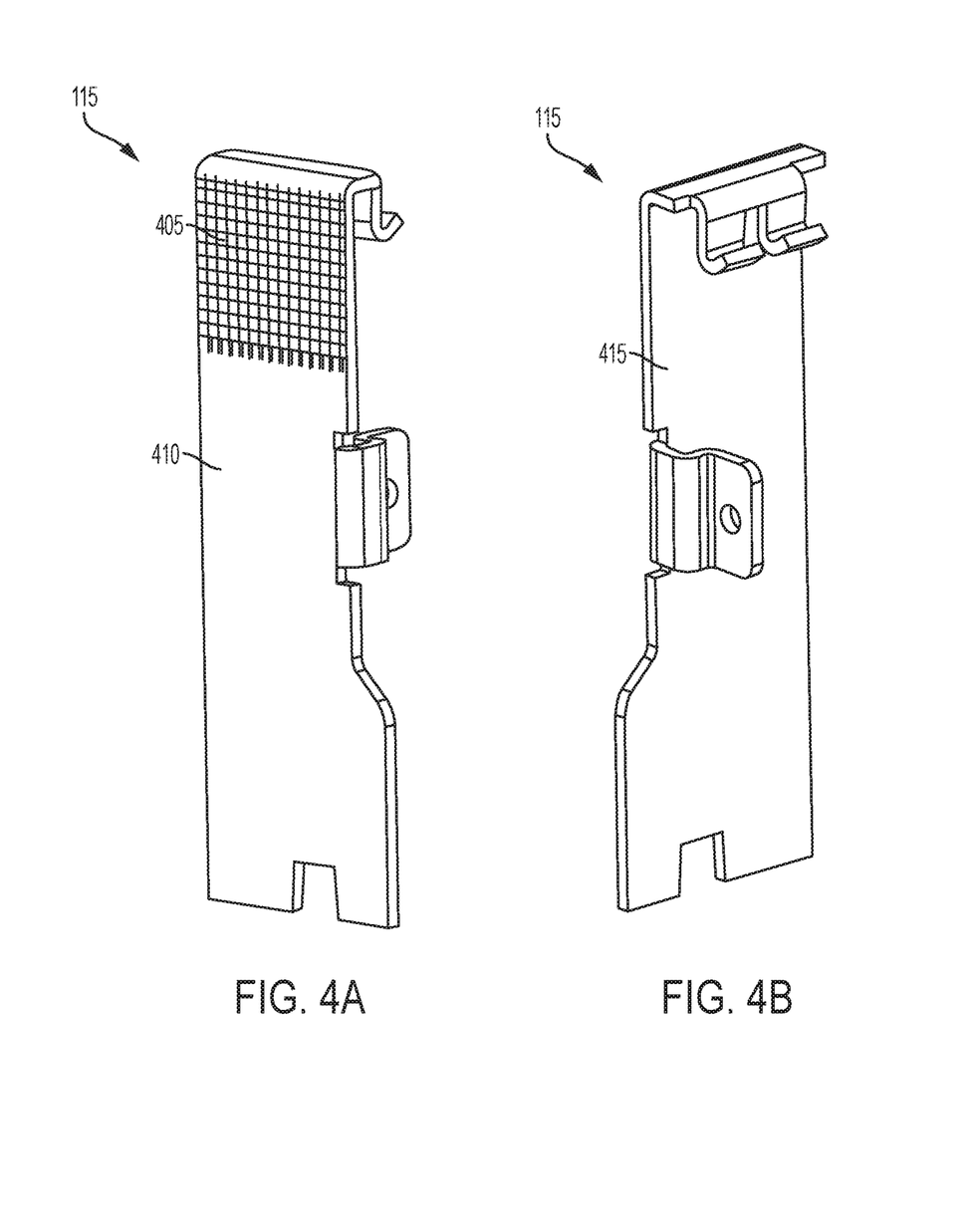
FIGS. 4A-4B are perspective views of a battery contact of the battery pack of FIGS. 1A-1C according to another embodiment of the invention.

Due to vibration experienced by the device 205, contact surfaces between the battery contacts 115 and the legs 305, 315 of the leaf spring contact 215 may experience fretting corrosion. As a result, such fretting corrosion produces electrical resistance at the contact surfaces that can generate heat between the battery contacts 115 and the leaf spring contact 215. To reduce the amount of heat generated due to electric current passing through fretting corrosion at the contact surfaces between the battery contacts 115 and the leaf spring contact 215, the battery contacts 115 include a surface texture 405, such as knurling, as will be explained in greater detail below. As shown in FIGS. 1B, 1C, and 4A, the surface texture 405 is located on a first surface 410 of the battery contact 115. Furthermore, the surface texture 405 is located on a portion of the first surface 410 that engages with the legs 305, 315 of the leaf spring contact 215. In other words, the surface texture 405 is located on a portion of a first surface 410 that is exposed by the tower portion housing 135 (FIG. 1A). As shown in FIGS. 1B and 1C, the battery contacts 115 extend vertically and are approximately parallel (i.e., the first surfaces 410 of each of the battery contacts 115 are approximately parallel). Furthermore, as shown in FIGS. 1B and 1C, the surface texture 405 of the battery contacts 115 face in opposite directions (i.e., the first surfaces 410 of each battery contact 115 face in opposite directions). As shown in FIG. 4B, each of the battery contacts 115 includes a second surface 415 that is opposite the first surface 410. The second surfaces 415 of each battery contact 115 face each other, as shown in FIGS. 1B and 1C.

Figure 5:
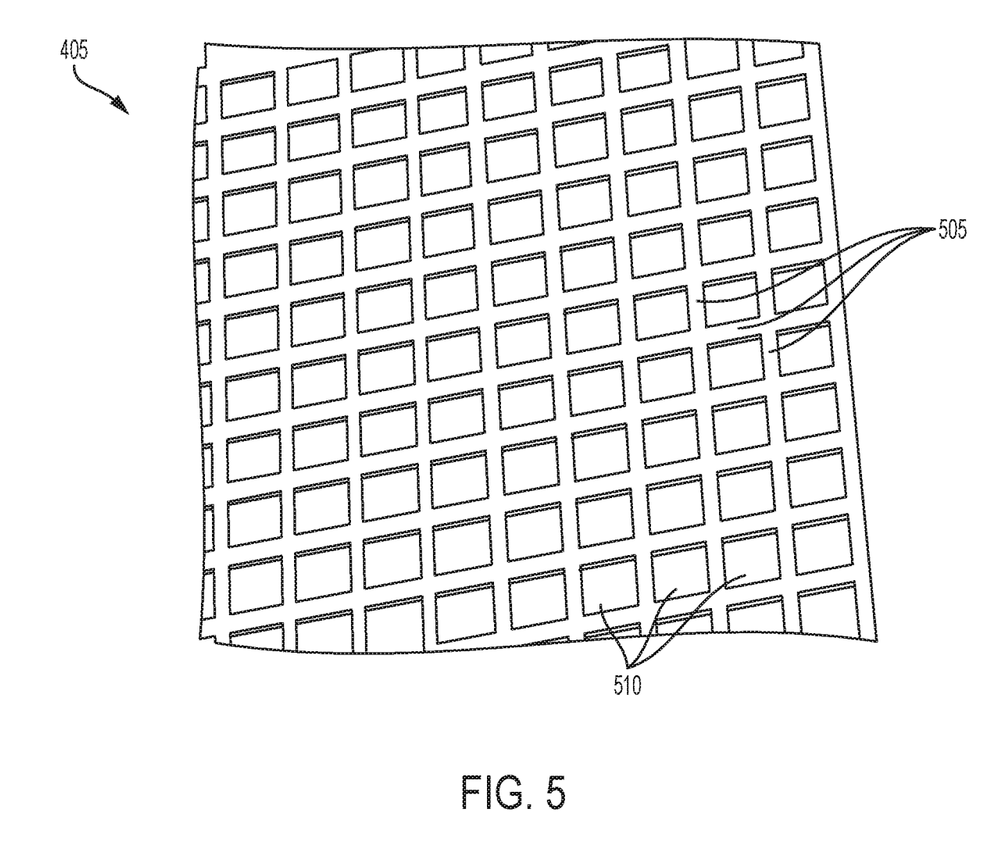
FIG. 5 is an enlarged view of a surface texture on the battery contact of FIGS. 4A-4B.

The surface texture 405 reduces the amount of heat generated due to electric current passing through fretting corrosion at the contact surfaces between the battery contacts 115 and the leaf spring contact 215 by providing for regions away from the contact surface for accumulating oxides to settle. For example, FIG. 5 illustrates a magnified view of the surface texture 405. As shown in FIG. 5, the surface texture 405 includes raised portions 505 that provide a contact surface between the battery contact 115 and the leaf spring contact 215. The surface texture 405 also includes recessed regions 510 that do not contact the leaf spring contact 215. Accordingly, the raised portions 505 of the surface texture 405 allow for the battery contacts 115 to provide a contact surface to transfer electric current from the battery pack 100 to the device 205. The recessed regions 510 of the surface texture 405 are spaced away from the contact surface and provide spaces between the contact surface of the battery contacts 115 and the leaf spring contact 215. These spaces allow for accumulating oxides due to fretting corrosion to settle away from the contact surface. In turn, this limits additional resistance that may be provided by the accumulating oxides, which reduces the heat generated at the contact surface due to electric current passing through fretting corrosion.

Figure 6A:
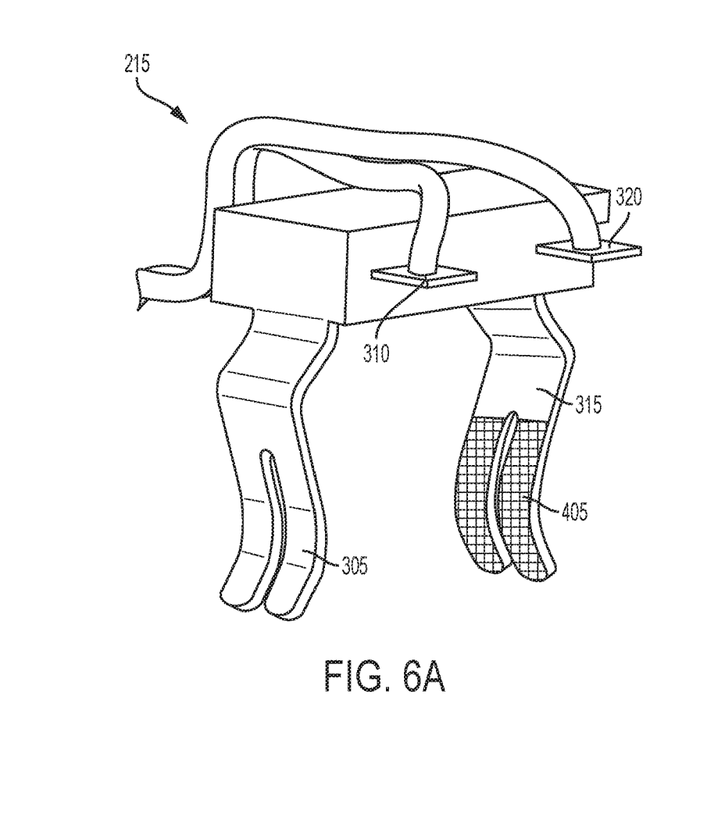
FIGS. 6A-6B are perspective views of a leaf spring contact of the devices of FIGS. 2A-2C that is used to electrically couple the devices of FIGS. 2A-2C to the battery pack of FIGS. 1A-1C according to another embodiment of the invention.
Figure 6B:
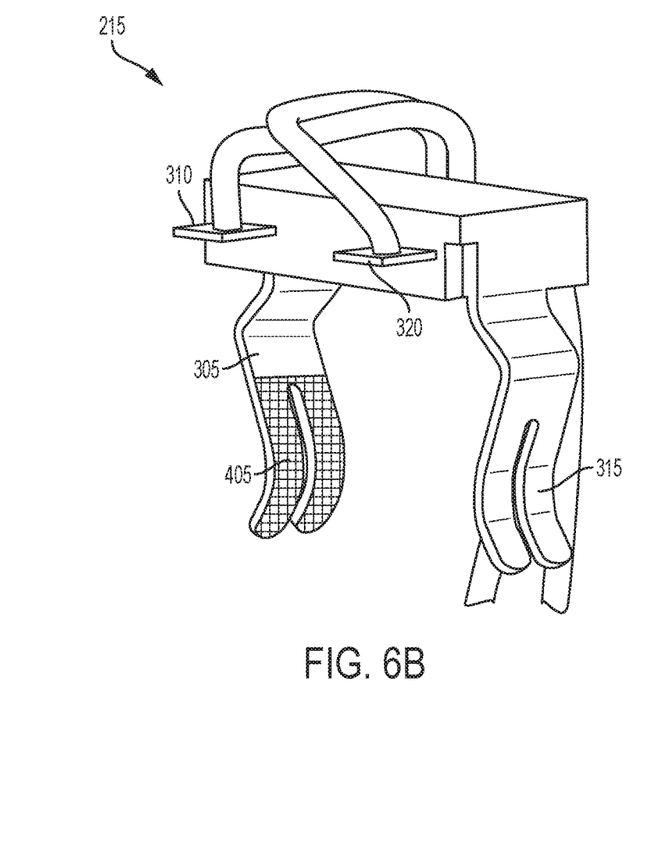

It should be understood that the surface texture 405 is merely exemplary and other types of surface texture may be used in some embodiments. For example, in some embodiments the surface texture 405 may include dimples, ribs, an embossed pattern, and/or a different knurled pattern than that shown in FIG. 5. Furthermore, although the surface texture 405 is described as being located on the battery contacts 115, in some embodiments, the legs 305, 315 of the leaf spring contact 215 may also include the surface texture 405 (see, e.g., FIGS. 6A and 6B). FIGS. 6A and 6B are perspective views of the leaf spring contact 215 from different viewing angles to show the surface texture 405 on the second leg 315 and the first leg 305, respectively. In some embodiments, both the battery contacts 115 and the contacts of the device 205 (i.e., legs 305, 315 of the leaf spring contact 215) include a surface texture. In alternative embodiments, only the battery contacts 115 include a surface texture. In other embodiments, only the contacts of the device 250, 205 include a surface texture.

Although the invention has been described in detail with reference to certain preferred embodiments, variations and modifications exist within the scope and spirit of one or more independent aspects of the invention as described.

We claim:

1. A battery pack operable to provide power to a device through a device contact of the device, the battery pack comprising:
   a battery pack housing including a main body housing and a tower portion that extends from the main body housing, wherein the battery pack housing is configured to be supported by and removably mounted to a device housing of the device;
   at least one battery cell located within the battery pack housing; and
   battery contacts positioned on the tower portion and including a positive terminal and a negative terminal, wherein the battery contacts are configured to engage the device contact of the device and allow electric current to transfer from the battery pack to the device,
   wherein each of the battery contacts includes an outwardly facing first surface;
   wherein the tower portion of the battery pack housing is configured to be inserted into a battery receptacle portion of the device housing along an axis parallel to the first surfaces of the battery contacts, the axis being defined by the tower portion extending upwardly from the main body housing;
   wherein the device contact includes a leaf spring contact including a first leaf spring and a second leaf spring, the first leaf spring and the second leaf spring each configured to be inwardly biased toward the tower portion and each configured to expand outwardly over side surfaces of the tower portion to receive the tower portion of the battery pack housing and engage one of the first surfaces of the battery contacts when the battery pack is inserted into the device;
   wherein the first surfaces of the battery contacts have a surface texture, the surface texture including
      raised portions that define a contact surface for contacting the device contact to allow the electric current to transfer from the battery pack to the device, and
      recessed regions spaced away from the contact surface and for providing a space between the battery contacts and the device contact.
2. The battery pack of claim 1, wherein the space between the battery contacts and the device contact allows oxides produced by fretting corrosion to accumulate away from the contact surface between the device contact and the raised portions of the battery contacts.
3. The battery pack of claim 1, wherein the first surfaces of the battery contacts are parallel to each other and face in opposite directions.
4. The battery pack of claim 1, further comprising a printed circuit board electrically coupled to the battery contacts, wherein the printed circuit board is located in the main body housing and is oriented perpendicular to the first surfaces of the battery contacts.
5. The battery pack of claim 4, wherein the printed circuit board is located between the battery contacts and the at least one battery cell.
6. The battery pack of claim 1, wherein the surface texturing includes at least one of knurling, dimples, and ribs.
7. The battery pack of claim 1, wherein the device includes a power tool, wherein the power tool experiences vibration during operation.
8. An electrical combination comprising:
   a battery pack including
      a battery pack housing including a main body housing and a tower portion that extends from the main body housing,
      at least one battery cell located within the battery pack housing, and
      battery contacts positioned on the tower portion and including a positive terminal and a negative terminal, wherein each of the battery contacts includes an outwardly facing first surface; and
   a device operable to be powered by the battery pack, the device including
      a device housing configured to receive the battery pack, wherein the battery pack is supported by and removably mounted to the device housing, wherein a battery receptacle portion of the device housing receives the tower portion of the battery pack housing along an axis parallel to the first surfaces of the battery contacts, the axis being defined by the tower portion extending upwardly from the main body housing, and
      a device contact for engaging the battery contacts and facilitating electric current to transfer from the battery pack to the device, wherein the device contact includes a leaf spring contact including a first leaf spring and a second leaf spring, the first leaf spring and the second leaf spring each configured to be inwardly biased toward the tower portion and each configured to expand outwardly over side surfaces of the tower portion to receive the tower portion of the battery pack housing and engage one of the first surfaces of the battery contacts when the battery pack is inserted into the device;
   wherein at least one of the device contact and the first surfaces of the battery contacts include a surface texture including
      raised portions that define a contact surface between the device contact and the battery contacts to allow the electric current to transfer from the battery pack to the device, and
      recessed regions recessed from the contact surface and defining a space between the device contact and the battery contacts.
9. The electrical combination of claim 8, wherein the first surfaces of the battery contacts include the surface texture.
10. The electrical combination of claim 8, wherein the device contact includes the surface texture.

11. The electrical combination of claim 8, wherein the first surfaces of the battery contacts include the surface texture and the device contact includes the surface texture.

12. The electrical combination of claim 8, wherein the space between the device contact and the battery contacts allows oxides produced by fretting corrosion to accumulate away from the contact surface between the device contact and the battery contacts.

13. The electrical combination of claim 8, wherein the first surfaces are parallel to each other and face in opposite directions.

14. The electrical combination of claim 8, wherein the battery pack includes a printed circuit board electrically coupled to the battery contacts, wherein the printed circuit board is located in the main body housing and is oriented perpendicular to the first surfaces of the battery contacts.

15. The electrical combination of claim 14, wherein the printed circuit board is located between the battery contacts and the at least one battery cell.

16. The electrical combination of claim 9, wherein the surface texture includes at least one of knurling, dimples, and ribs.

\* \* \* \* \*